United States Patent Office 3,381,012
Patented Apr. 30, 1968

3,381,012
PRIMARY, SECONDARY, AND TERTIARY-(1-PIPERIDYL)-LOWER-ALKYLAMINES
Bernard L. Zenitz, Colonie, and Alexander R. Surrey, Albany, N.Y., assignors to Sterling Drug Inc., New York, N.Y., a corporation of Delaware
No Drawing. Continuation-in-part of application Ser. No. 432,845, Feb. 15, 1965. This application Nov. 25, 1966, Ser. No. 596,832
26 Claims. (Cl. 260—293)

ABSTRACT OF THE DISCLOSURE

Primary, secondary, and tertiary (1-piperidyl)-lower-alkylamines, for example N,N-bis-[6-(4-cyclohexylmethyl-1-piperidyl)hexyl]amine, having anti-inflammatory, anti-diarrheal, coronary dilator, hypotensive, anti-fungal, anti-viral, anthelmintic, and psychomotor depressant activities, the primary and secondary amines being prepared by catalytic reduction of 1-(cyano-lower-alkyl)-piperidines, and tertiary amines being prepared by reduction of N-[ω-(1-piperidyl)-lower-alkanoyl]-N,N-bis-[(1-piperidyl)-lower-alkyl]amines.

---

This application is a continuation-in-part of our prior copending application Ser. No. 432,845, filed Feb. 15, 1965, now U.S. Patent 3,325,500, patented June 13, 1967, which in turn is a continuation-in-part of our prior application Ser. No. 129,995, filed Aug. 8, 1961, and now abandoned.

This invention relates to primary, secondary, and tertiary (1-piperidyl)-lower-alkylamines, their acid-addition salts, and to processes for the preparation thereof.

Said amines have utility as chemotherapeutic and pharmacodynamic agents of a nature to be more fully described hereinafter. The primary and secondary amines have further utility as intermediates in the preparation of certain 2- and 4-[(1-piperidyl)-lower-alkylamino]quinolines, and 2- and 4-{N,N-bis-[(1-piperidyl)-lower-alkyl]amino}quinolines which are described and claimed in our copending application Ser. No. 433,514, filed Feb. 17, 1965, and now abandoned, which is a division of our above-noted application Ser. No. 129,995.

The compounds of the instant invention are represented by the formula:

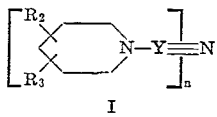

I wherein $R_2$ is lower-alkyl, unsubstituted-carbamyl, N-lower-alkylcarbamyl, N,N-di-lower-alkylcarbamyl, piperidinocarbonyl, pyrrolidinocarbonyl, hydroxy, lower-alkoxy, phenoxy, naphthoxy, phenyl-lower-alkoxy, naphthyl-lower-alkoxy, hydroxy-lower-alkyl, lower-alkoxy-lower-alkyl, phenoxy-lower-alkyl, naphthoxy-lower alkyl, lower-alkanoylamino, phenyl-lower-alkyl, cycloalkyl-lower-alkyl, or the group

where $R_4$ is phenyl, naphthyl, pyridyl, 3- or 4-piperidyl or 3- or 4-piperidyl substituted on the nitrogen atom by lower-alkyl, lower-alkanoyl, phenyl-lower-alkyl, or benzoyl; $R_5$ is hydrogen, lower-alkyl, lower-alkanoyl, phenyl-lower-alkyl, benzoyl, carbamyl, N-lower-alkylcarbamyl, N,N,-di-lower-alkylcarbamyl, or carbo-lower-alkoxy; $R_4$ and $R_5$ taken together with the nitrogen atom to which they are attached form a heterocyclic ring, for example isoindolinyl, pyrrolidyl, piperidyl, piperazinyl, or piperazinyl substituted on the 4-nitrogen atom by lower-alkyl, lower-alkanoyl, phenyl, phenyl-lower-alkyl, or benzoyl; $R_3$ is hydrogen or from one to five lower-alkyl radicals; Y is lower-alkylene containing from two to eight carbon atoms and interposing at least two carbon atoms between the amino nitrogen atom of the (1-piperidyl)-lower-alkylamino group and the ring nitrogen atom of the piperidine nucleus; and $n$ is the integers 1, 2, or 3, the extra valences on the amino nitrogen atom being taken up by hydrogen atoms when $n$ is 1 or 2.

The primary and secondary amines of Formula I where $n$ is 1 or 2 are useful as intermediates for the preparation of 2- and 4-[(1-piperidyl)-lower-alkylamino]quinolines and 2- and 4-{N,N-bis-[(1-piperidyl)-lower-alkyl]amino}quinolines having the formulas:

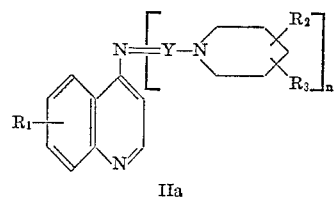

IIa and

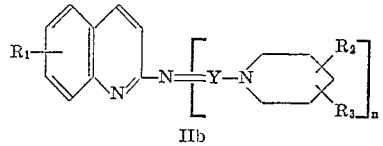

IIb where $R_1$ is hydrogen, halogen (including fluorine, chlorine, bromine, and iodine), lower-alkoxy, hydroxy, monocarbocyclic aryl-lower-alkoxy, trifluoromethyl, lower-alkylmercapto, lower-alkylsulfinyl, or lower-alkylsulfonyl, $n$ is the integers 1 or 2, and $R_2$, $R_3$, and Y have the meanings given above. The preparation of the compounds of Formulas IIa and IIb from the compounds of Formula I is effected by reacting the compounds of Formula I where $n$ is 1 or 2 with a 2- or 4-haloquinoline.

In the above general Formula I, $R_3$ stands for hydrogen or from one to five lower-alkyl radicals. When $R_3$ is one or more lower-alkyl radicals, each lower-alkyl radical can be straight or branched and can occupy any of the five available positions on the piperidine ring, and when $R_3$ is more than one lower-alkyl radical, said radicals can be the same or different and can occupy the same or different positions on the piperidine ring.

As used herein the terms lower-alkyl, lower-alkoxy, or lower-alkanoyl mean such groups containing from one to ten carbon atoms which can be either straight or branched and thus represent, inter alia, methyl, ethyl, n-propyl, isopropyl, n-butyl, n-hexyl, methoxy, ethoxy, propoxy, isopropoxy, butoxy, hexyloxy, formyl, acetyl, propionyl, isobutyryl, caproyl, and the like.

As used herein the term cycloalkyl means cycloalkyl containing from three to seven carbon atoms, and thus represents, inter alia, cyclopropyl, cyclobutyl, cyclopentyl, cyclohexyl, or cycloheptyl.

In the above general Formula I when $R_2$, $R_4$, or $R_5$ represent a substituent bearing a phenyl (or benzyl), or naphthyl radical, the benzene or naphthalene rings thereof can be unsubstituted or can bear one or more substituents of low molecular weight and of such nature that they do not interfere with or take part in the reactions, to be described hereinafter, used in the preparation of the compounds. Examples of such substituents include halogen, lower-alkyl, lower-alkoxy, lower-alkylmercapto, lower-alkylsulfinyl, lower-alkylsulfonyl, trifluoromethyl, methylenedioxy, ethylenedioxy, carbo-lower-alkoxy, 2-phenylethoxy, benzyl, lower-alkanoyl, sulfamyl, amino, lower-alkanoylamino, lower-alkoxycarbonylamino, lower-alkanoyloxy, hydroxy, and the like. It will be understood that compounds bearing such substituents are the full equivalents of the unsubstituted compounds and are within the purview of the invention.

In the above general Formula I, Y is lower-alkylene containing from two to eight carbon atoms and interposing at least two carbon atoms between the amino nitrogen atom of the (1-piperidyl)-lower-alkylamino group and the ring nitrogen atom of the piperidine nucleus. The lower-alkylene group can be straight or branched and thus stands, inter alia, for 1,2-ethylene [—$CH_2CH_2$—], 1,3-propylene [—$(CH_2)_3$—], 1,2-(2-methylethylene)

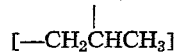

1,4-butylene [—$(CH_2)_4$—], 1,5-pentylene [—$(CH_2)_5$—], 1,6-hexylene [—$(CH_2)_6$—], 1,7-heptylene [—$(CH_2)_7$—], 1,8-octylene [—$(CH_2)_8$—], and the like.

The mono- and bis-[(1-piperidyl)-lower-alkyl]amines of Formula I ($n$ is 1 or 2) are prepared by reducing, with hydrogen in the presence of a catalyst, a 1-(cyano-lower-alkyl)-piperidine having the formula

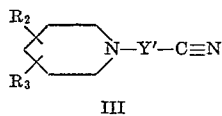

III where $R_2$ and $R_3$ have the meanings given above; and Y' is lower-alkylene containing from one to seven carbon atoms and interposing at least one carbon atom between the ring nitrogen atom of the piperidine nucleus and the cyano group.

The reduction of the compounds of Formula III is carried out in an organic solvent inert under the conditions of the reaction, for example methanol, ethanol, or isopropanol, at a temperature in the range from about 20° C. to about 70° C. and at hydrogen pressures in the range from about 40 pounds p.s.i. to about 1,000 pounds p.s.i. When the reduction is carried out in a neutral medium, the bis-[(1-piperidyl)-lower-alkyl]amines of Formula I ($n$ is 2) are the predominant products although the mono-[(1-piperidyl)-lower-alkyl]amines ($n$ is 1) are also produced. On the other hand, if the solvent used is first saturated with anhydrous ammonia, so that the reaction medium is strongly ammoniacal, the predominant products are the mono-[(1-piperidyl)-lower-alkyl]amines, although the bis-[(1-piperidyl)-lower-alkyl]amines are also produced in minor amounts. Suitable catalysts are platinum oxide, palladium-on-charcoal, and rhodium-on-alumina. A preferred catalyst is rhodium-on-alumina.

The compounds of Formula I where $n$ is 3 are prepared by reacting the corresponding secondary amines ($n$ is 2) with an ω-(1-piperidyl)-lower-alkanoic acid in the presence of a lower-alkyl chloroformate and an acid-acceptor, for example, triethylamine, and reducing the N-[ω-(1-piperidyl)-lower-alkanoyl]-N,N-bis-[(1-piperidyl)-lower-alkyl]amine thus formed with an alkali metal aluminum hydride. The reactions are represented by the equation:

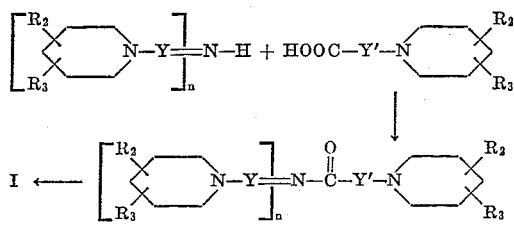

where $R_2$, $R_3$, Y, Y', and $n$ have the meanings given above.

The 1-(cyano-lower-alkyl)piperidines of Formula III are disclosed in and are prepared by methods described in our U.S. Patent 3,262,936 (patented July 26, 1966). These methods comprise, for example, reacting an acrylonitrile with a piperidine in the presence of a basic catalyst, a method used for the preparation of the compounds where Y' is lower-alkylene interposing two carbon atoms between the cyano group and the ring nitrogen atom of the piperidine nucleus. The reaction is represented by the equation:

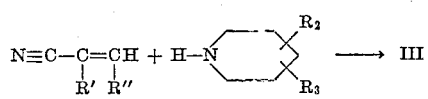

where $R_2$ and $R_3$ have the meanings given above and each of R' and R'' stands for hydrogen or the methyl radical, or one of R' and R'' is hydrogen while the other is the ethyl radical. The reaction is preferably carried out in a solvent inert under the conditions of the reaction, for example, water, benzene, dioxane, pyridine, or acetonitrile. The reaction is also advantageously carried out in an excess of acrylonitrile. Suitable basic catalysts are tri-lower-alkylamines, for example, triethylamine, or basic tertiary heterocyclic amines, for example, pyridine, or quaternary ammonium hydroxides, for example Triton B® (benzyl trimethylammonium hydroxide). A preferred basic catalyst is triethylamine.

The compounds of Formula III where Y' is lower-alkylene interposing from one to seven carbon atoms between the cyano group and the ring nitrogen atom of the piperidine nucleus are prepared by reacting a cyano-lower-alkyl halide with an appropriate substituted-piperidine in the presence of an acid-acceptor. The reaction is preferably carried out in an organic solvent inert under the conditions of the reaction, for example, tetrahydrofuran, acetone, methanol, ethanol, isopropanol, and the like. The purpose of the acid-acceptor is to take up the hydrogen halide split out during the course of the reaction and is a basic substance which forms water-soluble by-products easily separable from the main product of the reaction and includes such substances as alkali metal salts of weak acids, e.g., sodium carbonate, sodium bicarbonate, potassium carbonate, sodium acetate, and the like. The acid-acceptor can also be in the form of an excess quantity of the substituted-piperidine.

The novel compounds of the instant invention are the compounds of Formula I and their acid-addition salts. The compounds of Formula I, in free base form, are converted to the acid-addition salt form by interaction of the base with an acid. In like manner, the free bases can be regenerated from the acid-addition salt form in the conventional manner, that is, by treating the salts with strong aqueous bases, for example, alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formula I not only represents the structural configuration of the bases of the invention but is also representative of the structural entity which is common to all of our compounds of Formula I, whether in the form of the free bases or in the form of the acid-addition salts of the bases. We have found that by virtue of this common structural entity, the bases and their acid-addition salts have inherent pharmacodynamic and chemotherapeutic activity of a type to be more fully described hereinbelow. This inherent pharmacodynamic and chemotherapeutic activity can be enjoyed in useful form for pharmaceutical purposes by employing the free bases themselves or the acid-addition salts formed from pharmaceutically-acceptable acids, that is acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack of crystalline character may make some particular salt species unsuitable or less desirable for use as such in a given pharmacuetical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, our salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt, by for example, ion-exchange procedures.

It will be appreciated from the foregoing that all of the acid-addition salts of our new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new primary, secondary, and tertiary [(1-piperidyl)-lower-alkyl]amines and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids; such as found, for example in Beilstein's Organische Chemie, 4th ed., volumes III, IV, IX, X, XIV, XVII, XIX, XXI, XXII, and XXV; organic mono- and poly-sulfonic and -sulfinic acids; such as found, for example, in Beilstein volumes VI, XI, and XXII; organic phosphonic and phosphinic acids; such as found, for example, in Beilstein volumes XI and XVI; organic acids of arsenic and antimony; such as found, for example, in Beilstein volume XVI; organic heterocyclic carboxylic, sulfonic, and sulfinic acids such as found, for example, in Beilstein volumes XVIII, XXII, and XXV; acidic ion-exchange resins; and inorganic acids of any acid-forming element or combination of elements, such as found in Mellor, Comprehensive Treatise on Inorganic and Theoretical Chemistry, Longman's, Green and Co., New York, N.Y. volumes I–XVI. In addition, other salt-forming compounds which are acidic in their chemical properties, but which are not generally considered as acids in the same sense as carboxylic or sulfonic acids, are also considered to be among the numerous acids which can be used to prepare acid-addition salts of the compounds of the invention. Thus there is also comprehended acidic phenolic compounds, such as found, for example, in volume VI of Beilstein, acidic compounds having "activated" or acidic hydrogen atoms, as for example, picrolonic acid, or barbituric acid derivatives having an acidic proton, such as found, for example, in Cox et al. Medicinal Chemistry vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example, boron trifluoride.

Thus appropriate acid-addition salts are those derived from such diverse acids as formic acid, acetic acid, isobutyric acid, alpha-mercaptopropionic acid, malic acid, fumaric acid, succinic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethyphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I have shown that they possess pharmacodynamic and chemotherapeutic properties, in particular, anti-inflammatory, anti-diarrheal, coronary dilator, hypotensive, anti-fugal, anti-viral, anthelmintic, and psychomotor depressant activities thus indicating their usefulness as anti-inflammatory, anti-diarrheal, anti-fungal, anti-viral, and blood pressure lowering agents, coronary dilators, anthelmintics, and tranquilizers.

The structures of the compounds of the invention are established by their mode of synthesis and corroborated by the correspondence between calculated values for the elements and values found by chemical analysis.

The following examples will further illustrate the invention without the latter being limited thereto.

EXAMPLE 1

3-(4-carbamyl-1-piperidyl)propylamine [I: $R_2$ is 4-$CONH_2$; $R_3$ is H; Y is $(CH_2)_3$; $n$ is 1]

To a solution of 34.75 g. (0.19 mole) of 1-(2-cyanoethyl)-4-carbamylpiperidine in 450 ml. of ethanol saturated with anhydrous ammonia was added 4.2 g. of a 5% rhodium-on-alumina catalyst. The mixture was reduced with hydrogen under an initial pressure of 210 pounds p.s.i. at a temperature of 25° C. Reduction was complete in three hours. The catalyst was removed by filtration, washed with ethanol, the filtrate concentrated to dryness in vacuo and the white crystalline residue extracted with acetone, filtered, and the filtrate taken to dryness yielding 2.4 g. of a white powder which was recrystallized twice from a benzene-hexane mixture giving 22.0 g. of 3-(4-carbamyl-1-piperidyl)propylamine, M.P. 85–88° C. (uncorr.)

3-(4-carbamyl - 1 - piperidyl)propylamine reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, alpha-mercaptopropiomate, malate (or acid malate), fumarate (or acid fumarate), succinate (or acid succinate), succinamate, tartrate (or bitartrate), citrate (or acid citrate) lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate, and boron trifluoride salts.

3-(4-carbamyl-1-piperidyl)propylamine can be reacted with hydriodic acid to form 3-(4-carbamyl-1-piperidyl)propylamine hydriodide, useful as a characterising intermediate.

3-(4-carbamyl-1-piperidyl)propylamine, in the form of its hydriodide salt, can be converted to the hydrochloride salt by passing an aqueous solution of the former over an ion-exchange resin saturated with chloride ions, for example, Rohm & Hass' Amberlite® IRA-400 resin.

EXAMPLE 2

N,N-bis-[6-(4-cyclohexylmethyl-1-piperidyl)hexyl]amine
[I: $R_2$ is 4-$C_6H_{11}CH_2$; $R_3$ is H; Y is $(CH_2)_6$; $n$ is 2]

(a) 1-(5-cyanopentyl) - 4 - cyclohexylmethylpiperidine (55.3 g., 0.2 mole) was dissolved in 250 ml. of ethanol and reduced over 4.5 g. of a rhodium-on-alumina catalyst under 60 pounds p.s.i. of hydrogen. When reduction was completed, the catalyst was removed by filtration and the residue distilled in vacuo, all material (22.7 g.) boiling at 117–128° C./0.046–0.055 mm. being collected as 6-(4-cyclohexylmethyl - 1 - piperidyl) - hexylamine. A small amount of the latter in isopropanol was converted to the dihydrochloride salt and recrystallized twice from ethanol-acetone to give 6-(4-cyclohexylmethyl-1-piperidyl)-hexylamine dihydrochloride, M.P. 231.6–236.2° C.

*Analysis.*—Calcd. for $C_{18}H_{36}N_2 \cdot 2HCl$: C, 61.17; H, 10.84; Cl, 20.07. Found: C, 61.20; H, 10.71; Cl, 19.63.

(b) The pot residue remaining after distillation of the primary amine was recrystallized several times from acetone-ethanol to give 26.6 g. of N,N-bis-[6-(4-cyclohexylmethyl-1-piperidyl)hexyl]amine, M.P. 53.5–54.5° C.

*Analysis.*—Calcd. for $C_{26}H_{69}N_3$: C, 79.49; H, 12.79; N, 7.72. Found: C, 79.33; H, 12.73; N, 7.59.

EXAMPLES 3–17

The following mono-[(1-piperidyl)-lower-alkyl]amines of Formula I [$n$ is 1; $R_3$ is H] listed below in Table I are prepared according to one of the procedures described above in Examples 1 or 2 by reduction of an appropriate 1-($\omega$-cyano-lower-alkyl)piperidine of Formula III with hydrogen over a rhodium-on-alumina catalyst. All melting points are corrected.

TABLE 1

| Ex. | $R_2$ | Y | Base or Salt | M.P. (° C.) | Cryst. from— |
|---|---|---|---|---|---|
| 3 | 4-CONHCH$_3$ | (CH$_2$)$_3$ | 2HCl | 239.6–240.6 | Ethanol/ether. |
| 4 | 4-CONHC$_2$H$_5$ | (CH$_2$)$_3$ | 2HCl | 245.0–246.2 | Do. |
| 5 | 4-CON(CH$_3$)$_2$ | (CH$_2$)$_3$ | Base | (a) | |
| 6 | 4-CON(C$_2$H$_5$)$_2$ | (CH$_2$)$_3$ | do | (b) | |
| 7 | 4-CH$_2$C$_6$H$_5$ | (CH$_2$)$_3$ | 2HCl | 191.6–193.4 | Do. |
| 8 | 4-CH$_2$C$_6$H$_{11}$ | (CH$_2$)$_3$ | 2HCl | 280.2–282.4 | Do. |
| 9 | 4-HO | (CH$_2$)$_3$ | Base | (c) | |
| 10 | 4-HO(CH$_2$)$_3$ | (CH$_2$)$_3$ | do | 163.8–165.2 | Isopropanol. |
| 11 | 4-(CH$_3$)$_2$CH | (CH$_2$)$_3$ | 2HCl | 215.2–217.8 | Do. |
| 12 | 3-CH$_3$CONH | (CH$_2$)$_3$ | Base | (d) | |
| 13 | 4-CH$_2$C$_6$H$_{11}$ | (CH$_2$)$_2$ | 2HCl | 259.8–262.8 | Ethanol/acetone. |
| 14 | 2-CH$_2$C$_6$H$_{11}$ | (CH$_2$)$_3$ | 2HCl | 200.0–206.8 | Isopropanol. |
| 15 | 4-CH$_2$C$_6$H$_{11}$ | (CH$_2$)$_4$ | 2HCl | 262.8–266.0 | Do. |
| 16 | 4-CH$_2$C$_6$H$_{11}$ | (CH$_2$)$_5$ | 2HCl | 250.6–257.2 | Do. |
| 17 | 4-CH$_2$C$_6$H$_{11}$ | (CH$_2$)$_7$ | 2HCl | 247.0–249.6 | Acetone. |

(a) B.P. 123–124° C./0.09 mm.; $n_D^{25}$=1.5042.
(b) B.P. 131–138° C./0.109–0.113 mm.; $n_D^{25}$=1.4938.
(c) B.P. 85.3–86° C./0.033 mm.; $n_D^{25}$=1.5050.
(d) B.P. 147–157° C./0.045–0.095 mm.; $n_D^{25}$=1.5070.

EXAMPLES 18–35

The following N,N - bis - [(1 - piperidyl)-lower-alkyl] amines of Formula I [$n$ is 2; $R_3$ is H] listed below in Table 2 are prepared according to one of the procedures described above in Examples 1 or 2 by reduction of an appropriate 1-($\omega$-cyano-lower-alkyl)piperidine of Formula III with hydrogen over a rhodium-on-alumina catalyst. All melting points are corrected.

TABLE 2

| Ex. | $R_2$ | Y | Salt | M.P. (° C.) | Cryst'd. from— |
|---|---|---|---|---|---|
| 18 | 4-CONHCH$_3$ | (CH$_2$)$_3$ | Base | 203.0–203.8 | Ethanol/acetone. |
| 19 | 4-CONHC$_2$H$_5$ | (CH$_2$)$_3$ | do | 191.2–192.8 | |
| 20 | 4-CON(CH$_3$)$_2$ | (CH$_2$)$_3$ | do | 87.8–88.6 | Hexane. |
| 21 | 4-CH$_2$C$_6$H$_5$ | (CH$_2$)$_3$ | 3HCl | 266.6–268.0 | Ether. |
| 22 | 4-CH$_2$C$_6$H$_{11}$ | (CH$_2$)$_3$ | 3HCl | 300 | Isopropanol/ether. |
| 23 | 4-(CH$_3$)$_2$CH | (CH$_2$)$_3$ | Base | (a) | |
| 24 | 4-HO | (CH$_2$)$_3$ | do | (b) | |
| 25 | 4-HO(CH$_2$)$_3$ | (CH$_2$)$_3$ | 3HCl | 191.2–199.4 | Isopropanol. |
| 26 | 4-CH$_2$C$_6$H$_{11}$ | (CH$_2$)$_2$ | 3HCl | 294.4–298.2 | Ethanol. |
| 27 | 4-CH$_2$C$_6$H$_{11}$ | (CH$_2$)$_3$ | Base | 37.2–43.0 | Acetone. |
| 28 | 2-CH$_2$C$_6$H$_{11}$ | (CH$_2$)$_3$ | 3HCl | 179.2–192.4 | Do. |
| 29 | 4-CH$_2$C$_6$H$_{11}$ | (CH$_2$)$_4$ | Base | 50.2–51.0 | Hexane. |
| 30 | 4-CH$_2$C$_6$H$_{11}$ | (CH$_2$)$_5$ | do | 57.2–58.5 | Acetone. |
| 31 | 4-CH$_2$C$_6$H$_{11}$ | (CH$_2$)$_7$ | do | 63.6–64.4 | Do. |
| 32 | 4-C$_6$H$_5$NCOCH$_3$ | (CH$_2$)$_3$ | 3HCl | 247.8–251.0 | Methanol/acetone. |
| 33 | 4-C$_6$H$_5$NH | (CH$_2$)$_3$ | 3H$_2$O | 80–92 | Acetone/water. |
| 34 | 4-C$_6$H$_5$NH | (CH$_2$)$_6$ | Base | 82.5–83.5 | Acetone. |
| 35 | 4-C$_6$H$_5$NCH$_3$ | (CH$_2$)$_3$ | 3H$_2$O | 88–100 | Acetone/water. |

(a) B.P. 125.5–131.0° C./0.0015 mm.; $n_D^{25}$=1.4832. Trihydrochloride, recrystallized from isopropanol, gave M.P. 291.2–293.4° C. (corr.).
(b) B.P. 186–193° C./0.002–0.0024 mm.; $n_D^{25}$=1.5197.

EXAMPLES 36–79

By following the manipulative procedure described above in Example 1, substituting for the 1-(2-cyanoethyl)-4-carbamylpiperidine used therein, a molar equivalent amount of an appropriate 1-(cyano-lower-alkyl)-substituted-piperidine, there can be obtained the (substituted-1-piperidyl)-lower-alkylamines of Formula I ($n$ is 1) listed below in Table 3.

TABLE 3

| Example | Y | R₂ | R₃ |
|---------|---|----|----|
| 36 | (CH₂)₃ | 4-CH₂OH | H |
| 37 | (CH₂)₃ | 4-CH₂CH₂CH₂OH | H |
| 38 | (CH₂)₂ | 4-HO | 2,6-(CH₃)₂ |
| 39 | (CH₂)₅ | 4-HO | 2,2,4,6,6-(CH₃)₅ |
| 40 | (CH₂)₃ | 4-HO | 2,2-(CH₃)₂-6-(CH₃)₂CHCH₂ |
| 41 | (CH₂)₃ | 4-(CH₂)₆OH | H |
| 42 | (CH₂)₃ | 4-NHCHO | H |
| 43 | (CH₂)₃ | 4-NHCOCH(C₂H₅)CH₂CH₃ | H |
| 44 | (CH₂)₃ | 3-CONHCH₂CH₂CH₃ | H |
| 45 | (CH₂)₃ | 4-CONC₅H₁₀ | H |
| 46 | (CH₂)₃ | 4-CONC₄H₈ | H |
| 47 | (CH₂)₃ | 4-C₆H₅O | H |
| 48 | (CH₂)₃ | 4-(2-naphthyl-O-) | H |
| 49 | (CH₂)₃ | 4-C₆H₅CH₂CH₂O | H |
| 50 | (CH₂)₃ | 4-(2-naphthyl-CH₂CH₂-O-) | H |
| 51 | (CH₂)₃ | 3-CH₃O | H |
| 52 | (CH₂)₄ | 4-C₂H₅O(CH₂)₃ | H |
| 53 | (CH₂)₂ | 3-(4-ClC₆H₄OCH₂CH₂) | H |
| 54 | (CH₂)₅ | 4-[(2-naphthyl)-O-(CH₂)₂] | H |
| 55 | (CH₂)₄ | 4-C₆H₅NH- | H |
| 56 | (CH₂)₃ | 4-C₆H₅ṄCH₃ | H |
| 57 | (CH₂)₃ | 4-C₆H₅ṄCOCH₃ | H |
| 58 | (CH₂)₃ | 4-C₆H₅ṄCH₂CH₂C₆H₅ | H |
| 59 | (CH₂)₄ | 4-C₆H₅ṄCOC₆H₅ | H |
| 60 | (CH₂)₂ | 2-naphthyl-NH | H |
| 61 | (CH₂)₃ | 4-(4-C₅H₄N)NH | H |
| 62 | (CH₂)₃ | 4-(3-piperidyl)NH | H |
| 63 | (CH₂)₃ | 4-(1-methyl-3-piperidyl)NH | H |
| 64 | (CH₂)₃ | 4-(1-acetyl-3-piperidyl)NH | H |
| 65 | (CH₂)₃ | 4-(1-phenethyl-3-piperidyl)NH | H |
| 66 | (CH₂)₃ | 4-(1-benzoyl-3-piperidyl)NH | H |
| 67 | (CH₂)₃ | 4-C₆H₅ṄCONH₂ | H |
| 68 | (CH₂)₃ | 4-C₆H₅ṄCONHCH₃ | H |
| 69 | (CH₂)₃ | 4-C₆H₅ṄCON(CH₃)₂ | H |
| 70 | (CH₂)₃ | 4-C₆H₅ṄCOOC₂H₅ | H |
| 71 | (CH₂)₃ | 4-(2-isoindolinyl) | H |
| 72 | (CH₂)₃ | 4-(1-pyrrolidyl) | H |
| 73 | (CH₂)₃ | 4-(1-piperidyl) | H |
| 74 | (CH₂)₃ | 4-(1-piperazinyl) | H |
| 75 | (CH₂)₃ | 4-(4-methyl-1-piperazinyl) | H |
| 76 | (CH₂)₃ | 4-(4-acetyl-1-piperazinyl) | H |
| 77 | (CH₂)₃ | 4-(4-phenyl-1-piperazinyl) | H |
| 78 | (CH₂)₃ | 4-(4-phenethyl-1-piperazinyl) | H |
| 79 | (CH₂)₃ | 4-(4-benzoyl-1-piperazinyl) | H |

EXAMPLES 80–121

By following the manipulative procedure described above in Example 2, substituting for the 1-(5-cyanopentyl)-4-cyclohexylmethylpiperidine used therein, a molar equivalent amount of an appropriate 1-(cyano-lower-alkyl)-substituted-piperidine, there can be obtained the N,N-bis-[(substituted-1-piperidyl)-lower-alkyl]amines of Formula I ($n$ is 2) listed below in Table 4.

TABLE 4

| Example | Y | R₂ | R₃ |
|---------|---|----|----|
| 80 | (CH₂)₃ | 4-CH₂OH | H |
| 81 | (CH₂)₃ | 4-CH₂CH₂CH₂OH | H |
| 82 | (CH₂)₂ | 4-HO | 2,6-(CH₃)₂ |
| 83 | (CH₂)₅ | 4-HO | 2,2,4,6,6-(CH₃)₅ |
| 84 | (CH₂)₃ | 4-HO | 2,2-(CH₃)₂-6-(CH₃)₂CHCH₂ |
| 85 | (CH₂)₃ | 4-(CH₂)₆OH | H |
| 86 | (CH₂)₃ | 4-NHCHO | H |
| 87 | (CH₂)₃ | 4-NHCOCH(C₂H₅)CH₂CH₃ | H |
| 88 | (CH₂)₃ | 3-CONHCH₂CH₂CH₃ | H |
| 89 | (CH₂)₃ | 4-CONC₅H₁₀ | H |
| 90 | (CH₂)₃ | 4-CONC₄H₈ | H |
| 91 | (CH₂)₃ | 4-C₆H₅O | H |
| 92 | (CH₂)₃ | 4-(2-naphthyl-O) | H |
| 93 | (CH₂)₃ | 4-C₆H₅CH₂CH₂O | H |
| 94 | (CH₂)₃ | 4-(2-naphthyl-CH₂CH₂-O) | H |
| 95 | (CH₂)₃ | 3-CH₃O | H |
| 96 | (CH₂)₄ | 4-C₂H₅O(CH₂)₃ | H |
| 97 | (CH₂)₂ | 3-(4-ClC₆H₅OCH₂CH₂) | H |
| 98 | (CH₂)₅ | 4-[(2-naphthyl)-O-(CH₂)₂] | H |
| 99 | (CH₂)₅ | 4-C₆H₅NH | H |
| 100 | (CH₂)₃ | 4-C₆H₅ṄCH₂CH₂C₆H₅ | H |
| 101 | (CH₂)₄ | 4-C₆H₅ṄCOC₆H₅ | H |
| 102 | (CH₂)₂ | 2-naphthyl-NH | H |
| 103 | (CH₂)₃ | 4-(4-C₅H₄N)NH | H |
| 104 | (CH₂)₃ | 4-(3-piperidyl)NH | H |
| 105 | (CH₂)₃ | 4-(1-methyl-3-piperidyl)NH | H |
| 106 | (CH₂)₃ | 4-(1-acetyl-3-piperidyl)NH | H |
| 107 | (CH₂)₃ | 4-(1-phenethyl-3-piperidyl)NH | H |
| 108 | (CH₂)₃ | 4-(1-benzoyl-3-piperidyl)NH | H |

TABLE 4—Continued

| Example | Y | R₂ | R₃ |
|---|---|---|---|
| 109 | (CH₂)₃ | 4-C₆H₅ṄCONH₂ | H |
| 110 | (CH₂)₃ | 4-C₆H₅ṄCONHCH₃ | H |
| 111 | (CH₂)₃ | 4-C₆H₅ṄCON(CH₃)₂ | H |
| 112 | (CH₂)₃ | 4-C₆H₅ṄCOOC₂H₅ | H |
| 113 | (CH₂)₃ | 4-(2-isoindolinyl) | H |
| 114 | (CH₂)₃ | 4-(1-pyrrolidyl) | H |
| 115 | (CH₂)₃ | 4-(1-piperidyl) | H |
| 116 | (CH₂)₃ | 4-(1-piperazinyl) | H |
| 117 | (CH₂)₃ | 4-(4-methyl-1-piperazinyl) | H |
| 118 | (CH₂)₃ | 4-(4-acetyl-1-piperazinyl) | H |
| 119 | (CH₂)₃ | 4-(4-phenyl-1-piperazinyl) | H |
| 120 | (CH₂)₃ | 4-(4-phenethyl-1-piperazinyl) | H |
| 121 | (CH₂)₃ | 4-(4-benzoyl-1-piperazinyl) | H |

EXAMPLE 122

N,N,N-tris-[7-(4-cyclohexylmethyl-1-piperidyl)heptyl]amine tetrahydrochloride [I: R₂ is 4-C₆H₁₁CH₂; R₃ is H; Y is (CH₂)₇; $n$ is 3]

A solution of 8.6 g. (0.015 mole) of N,N-bis-[7-(4-cyclohexylmethyl-1-piperidyl)heptyl]amine dissolved in 50 ml. of acetone and 50 ml. of tetrahydrofuran was added over a period of twenty minutes to a stirred solution of 4.63 g. (0.015 mole) of ω-(4-cyclohexylmethyl-1-piperidyl)heptanoic acid, 1.66 g. (0.017 mole) triethylamine, and 2.25 g. (0.017 mole) of isobutyl chloroformate in 300 ml. of acetone. The mixture was stirred in an ice bath for about a half hour, then at room temperature for five hours and allowed to stand overnight.

The mixture was then filtered, the filter washed with acetone and the combined filtrate and washings were taken to dryness. The residual gum was dissolved in ethanol, the solution treated with 4.3 ml. of 9.7 N ethanolic hydrogen chloride, cooled, and the solid which separated was collected, and recrystallized twice from ethanol-acetone to give 5.8 g. of N-[ω-(4-cyclohexylmethyl-1-piperidyl)heptanoyl]-N,N,-bis-[7-(4-cyclohexylmethyl-1-piperidyl)heptyl]amine trihydrochloride, M.P. 268–273° C.

The latter (7.7 g., 0.009 mole) as the free base was dissolved in ether and added over a period of about thirty minutes to a stirred slurry of 0.76 g. (0.02 mole) of lithium aluminum hydride in about 50 ml. of ether, and the mixture was refluxed for about four and a half hours, cooled, and hydrolyzed by addition of 1.8 ml. of water in a small volume of tetrahydrofuran. The mixture was filtered, the filter washed with a little ether and the combined filtrate taken to dryness. The residual gum was taken into a little ethanol, treated with 3.5 ml. of 9.7 N ethanolic hydrogen chloride, diluted with acetone, and the solid which separated was collected and recrystallized from methanol-ethyl acetate to give N,N,N-tris-[7-(4-cyclohexylmethyl-1-piperidyl)heptyl]amine tetrahydrochloride, M.P. 269.0–272.0° C. (corr.).

EXAMPLE 123

3-[4-(N-phenyl-N-ethylamino)-1-piperidyl]propylamine trihydrochloride [I: R₂ is 4-C₆H₅ṄC₂H₅; R₃ is H; Y is (CH₂)₃; $n$ is 1]

A solution of 10.5 g. (0.04 mole) of 4-(N-phenyl-N-ethylamino)-1-(2-cyanoethyl)piperidine dissolved in 100 ml. of anhydrous ether was added dropwise with stirring to a slurry of 2.95 g. of lithium aluminum hydride in 50 ml. of ether. When addition was complete, the mixture was refluxed for an hour and a half and then hydrolyzed by dropwise addition of 12 ml. of a 1:1 mixture of water and tetrahydrofuran. Filtration of the mixture and evaporation of the filtrate to dryness afforded 9.9 g. of the product in free base form as a colorless oil. The latter was taken into ethanol and converted to the trihydrochloride salt, which on recrystallization from acetone-methanol gave 4.5 g. of 3-[4-(N-phenyl-N-ethylamino)-1-piperidyl]-propylamine trihydrochloride, M.P. 205° C. (indef.) (corr.).

Our new (1-piperidyl)-lower-alkylamines of Formula I showed anti-inflammatory activity in one or more of three different test procedures, viz., inhibition of granuloma pouch formation in rats, inhibition of dextran-induced local foot adema in rats, and inhibition of para-influenza (Sendai strain) virus-induced lung inflammation in mice. Data obtained for representative compounds of the series are given in Table 5 which follows. The activities are given in terms of the minimum dose (MIND) which is defined as the smallest dose, expressed in milligrams per kilogram of body weight, producing 30% inhibition of the inflammation in the lung inflammation and dextran edema tests and 40% inhibition in the granuloma pouch test. The symbols G.P., L.I., and D.E. represent the tests named above, namely the granuloma pouch, lung inflammation, and dextran edema tests, respectively, while the designations s.c. and p.o. represent subcutaneous and peroral routes of administration, respectively.

TABLE 5

| Example | G.P. | L.I. | D.E. |
|---|---|---|---|
| 2b | 25 (s.c.) | 100 (s.c.) | |
| 17 | | 25 (s.c.) | |
| 21 | | {100 (p.o.)<br>{6.25 (s.c.) | } 6.25 (s.c.) |
| 22 | 25 (p.o.) | {1.56 (s.c.)<br>{25 (p.o.) | 1.56 (s.c.)<br>100 (p.o.) |
| 26 | 1.56 (s.c.) | 100 (s.c.) | |
| 28 | {0.4 (s.c.)<br>{25 (p.o.) | | |
| 29 | 0.40 (s.c.) | 1.56 (s.c.) | |
| 30 | | 1.56 (s.c.) | |
| 2a | 0.10 (s.c.) | {1.56 (s.c.)<br>{100 (p.o.) | |
| 31 | 0.10 (s.c.) | | |
| 33 | | | 100 (p.o.) |
| 122 | | {6.25 (s.c.)<br>{100 (p.o.) | |
| 123 | | 25 (s.c.) | |

In addition to having anti-inflammatory activity, our new (1-piperidyl)-lower alkylamines showed hypotensive activity in renal hypertensive rats. Data, expressed either in terms of the average effective dose (AED) or the minimum effective hypotensive dose (MEHD), so-obtained for representative compounds in the series are given in Table 6 below.

TABLE 6

| Example: | Activity, mg./kg. (s.c.) |
|---|---|
| 4 | MEHD=1.0 |
| 6 | MEHD=1.0 |
| 10 | AED=90 |
| 21 | AED=40 |
| 22 | AED=3 |
| 23 | AED=40 |
| 24 | AED=90 |
| 28 | AED=15 |
| 29 | AED=2 |
| 30 | AED=50 |
| 32 | AED=60 |

The compounds of Formula I have also been shown to possess coronary dilator activity when tested in the isolated rabbit heart. Coronary dilator activity data so-obtained for representative compounds of the series are given in Table 7 below. The activities are expressed either in terms of the effective dose ($ED_{50}$) or in terms of the percent dilatation, at a given dose level, the doses in both cases being expressed in terms of the dose per heart.

TABLE 7

| Example: | Activity |
|---|---|
| 3 | 1.8% dilatation at 0.1 mg. |
| 13 | $ED_{50}$=87 mcg.; 164% of papaverine. |
| 15 | $ED_{50}$=50 mcg.; 284% of papaverine. |
| 17 | $ED_{50}$=33.5 mcg.; 424% of papaverine. |
| 21 | 24.7% dilatation at 0.05 mg. |
| 28 | $ED_{50}$=90 mcg.; 63% of papaverine. |
| 30 | 41% dilatation at 8 mg. |

The compounds of Formula I have also been shown to have psychomotor depressant activity as determined in mice using standard activity cages. Psychomotor depressant activity data so-obtained for representative compounds of the series are given below in Table 8. The data are given in terms of the percentage decrease in the animals' activity at a particular dose level.

TABLE 8

| Example: | Activity |
|---|---|
| 9 | 53% decrease at 64 mg./kg. (i.p.) |
| 15 | 87% decrease at 100 mg./kg. (p.o.) |
| 31 | 54% decrease at 300 mg./kg. (p.o.) |

The compounds of Formula I have also been shown to possess anthelmintic activity when administered orally to Swiss mice infected by the tapeworm, *Hymenolepis nana*, and the pinworm, *Aspicularis tetraptera*. Data so-obtained with representative compounds are given below in Table 9 and are expressed in terms of the dose, in mg./kg./day administered two times a day for four days, required to clear all of the animals in the test group of each of the test organisms.

TABLE 9

| Example | Dose (mg./kg./day) | |
|---|---|---|
| | Hy nana | Asp. tetraptera |
| 2b | 50 | 50 |
| 31 | 25 | |

The compounds have been shown to possess antidiarrheal activity in standard gastrointestinal propulsion tests in intact, unanesthetized animals which involves measurement, at the end of prescribed time intervals, of the relative distances traveled by a forced-fed charcoal meal along the alimentary tracts of premedicated and unmedicated rats. Thus N,N-bis-[3-(4-anilino-1-piperidyl)propyl]amine described above in Example 33 produced 18.5% inhibition of gastrointestinal propulsion at 20 mg./kg. (p.o.).

We claim:
1. A compound of the formula

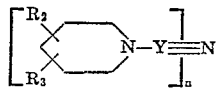

wherein $R_2$ is unsubstituted-carbamyl, N-lower-alkylcarbamyl, N,N-di-lower-alkylcarbamyl, piperidinocarbonyl, pyrrolidinocarbonyl, hydroxy, lower-alkoxy, phenoxy, naphthoxy, phenyl-lower-alkoxy, naphthyl-lower-alkoxy, hydroxy-lower-alkyl, lower-alkoxy-lower-alkyl, phenoxy-lower-alkyl, naphthoxy-lower alkyl, lower-alkanoylamino, cycloalkyl-lower-alkyl, or the group

where $R_4$ is phenyl, naphthyl, pyridyl, 3- or 4-piperidyl or 3- or 4-piperidyl substituted on the nitrogen atom by lower-alkyl, lower-alkanoyl, phenyl-lower alkyl, or benzoyl; and $R_5$ is hydrogen, lower-alkyl, lower-alkanoyl, phenyl-lower-alkyl, benzoyl, carbamyl, N-lower-alkylcarbamyl, N,N-di-lower-alkylcarbamyl, or carbo-lower-alkoxy, or $R_4$ and $R_5$ taken together with the nitrogen atom to which they are attached form a heterocyclic ring selected from the group consisting of isoindolinyl, pyrrolidyl, piperidyl, piperazinyl or piperazinyl substituted on the 4-nitrogen atom by lower-alkyl, lower-alkanoyl, phenyl, phenyl-lower-alkyl, or benzoyl; $R_3$ is hydrogen or from one to five lower-alkyls; Y is lower-alkylene; and $n$ is the integers 1, 2, or 3, the extra valences on the amino nitrogen atom being taken up by hydrogen atoms when $n$ is 1 or 2.

2. A compound according to claim 1 wherein $R_2$ is cycloalkyl-lower-alkyl, and $R_3$ is hydrogen.

3. A compound according to claim 1 wherein $R_2$ is N-phenylamino, and $R_3$ is hydrogen.

4. A compound according to claim 1 wherein $R_2$ is N-phenyl-N-lower-alkylamino, and $R_2$ is hydrogen.

5. A compound according to claim 1 wherein $R_2$ is N-phenyl-N-lower-alkanoylamino, and $R_2$ is hydrogen.

6. A compound of the formula:

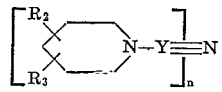

wherein $R_2$ is unsubstituted-carbamyl, N-lower-alkylcarbamyl, N,N-di-lower-alkylcarbamyl, piperidinocarbonyl, pyrrolidinocarbonyl, hydroxy, lower-alkoxy, phenoxy, naphthoxy, phenyl-lower-alkoxy, naphthyl-lower-alkoxy, hydroxy-lower-alkyl, lower-alkoxy-lower alkyl, phenoxy-lower-alkyl, naphthoxy-lower-alkyl, lower-alkanoylamino, phenyl-lower-alkyl, cycloalkyl-lower-alkyl, or the group

where $R_4$ is phenyl, naphthyl, pyridyl, 3- or 4-piperidyl or 3- or 4-piperidyl substituted on the nitrogen atom by lower-alkyl, lower-alkanoyl, phenyl-lower-alkyl, or benzoyl; and $R_5$ is hydrogen, lower-alkyl, loweralkanoyl, phenyl-lower-alkyl, benzoyl, carbamyl, N-lower-alkylcarbamyl, N,N-di-lower-alkylcarbamyl, or carbo-lower-alkoxy, or $R_4$ and $R_5$ taken together with the nitrogen atom to which they are attached form a heterocyclic ring selected from the group consisting of isoindolinyl, pyrrolidyl, piperidyl, piperazinyl or piperazinyl substituted on the 4-nitrogen atom by lower-alkyl, lower-alkanoyl, phenyl, phenyl-lower-alkyl, or benzoyl; $R_3$ is hydrogen or from one to five lower-alkyls; Y is lower-alkylene; and $n$ is one of the integers 2 and 3, the extra valence on the amino nitrogen atom being taken up by a hydrogen atom when $n$ is 2.

7. A compound according to claim 6 wherein $R_2$ is phenyl-lower-alkyl and $R_3$ is hydrogen.

8. 2 - (4-cyclohexylmethyl-1-piperidyl)ethylamine according to claim 2 wherein $R_2$ is 4-cyclohexylmethyl; Y is 1,2-ethylene; and $n$ is 1.

9. 3 - (2-cyclohexylmethyl-1-piperidyl)propylamine according to claim 2 wherein $R_2$ is 2-cyclohexylmethyl; Y is 1,3-propylene; and $n$ is 1.

10. 4 - (4-cyclohexylmethyl-1-piperidyl)butylamine according to claim 2 wherein $R_2$ is 4-cyclohexylmethyl; Y is 1,4-butylene; and $n$ is 1.

11. 5-(4-cyclohexylmethyl-1-piperidyl)pentylamine according to claim 2 wherein $R_2$ is 4-cyclohexylmethyl; Y is 1,5-pentylene; and $n$ is 1.

12. 6-(4-cyclohexylmethyl-1-piperidyl)hexylamine according to claim 2 wherein $R_2$ is 4-cyclohexylmethyl; Y is 1,6-hexylene; and $n$ is 1.

13. 7-(4-cyclohexylmethyl-1-piperidyl)heptylamine according to claim 2 wherein $R_2$ is 4-cyclohexylmethyl; Y is 1,7-heptylene; and $n$ is 1.

14. N,N-bis-[2 - (4-cyclohexylmethyl-1-piperidyl)ethyl]amine according to claim 2 wherein $R_2$ is 4-cyclohexylmethyl; Y is 1,2-ethylene; and $n$ is 2.

15. N,N-bis-[3-(2-cyclohexylmethyl - 1 - piperidyl)propyl]amine according to claim 2 wherein $R_2$ is 2-cyclohexylmethyl; Y is 1,3-propylene; and $n$ is 2.

16. N,N-bis-[4-(4-cyclohexylmethyl - 1 - piperidyl)butyl]amine according to claim 2 wherein $R_2$ is 4-cyclohexylmethyl; Y is 1,4-butylene; and $n$ is 2.

17. N,N-bis-[5-(4-cyclohexylmethyl-1-piperidyl) - pentyl]amine according to claim 2 wherein $R_2$ is 4-cyclohexylmethyl; Y is 1,5-pentylene; and $n$ is 2.

18. N,N-bis-[6-(4-cyclohexylmethyl - 1 - piperidyl)hexyl]amine according to claim 2 wherein $R_2$ is 4-cyclohexylmethyl; Y is 1,6-hexylene; and $n$ is 2.

19. N,N-bis-[7-(4-cyclohexylmethyl - 1 - piperidyl)heptyl]amine according to claim 2 wherein $R_2$ is 4-cyclohexylmethyl; Y is 1,7-heptylene; and $n$ is 2.

20. N,N,N-tris-[7-(4-cyclohexylmethyl - 1 - piperidyl)heptyl]amine according to claim 2 wherein $R_2$ is 4-cyclohexylmethyl; Y is 1,7-heptylene; and $n$ is 3.

21. N,N-bis-[3-(4-benzyl-1-piperidyl)propyl]amine according to claim 6 wherein $R_2$ is 4-benzyl; Y is 1,3-propylene; and $n$ is 2.

22. N,N-bis-{3-[4-(N-phenylamino) - 1 - piperidyl]propyl}amine according to claim 3 wherein $R_2$ is 4-(N-phenylamino); Y is 1,3-propylene; and $n$ is 2.

23. N,N-bis-{6-[4-(N-phenylamino)-1-piperidyl]hexyl}amine according to claim 3 wherein $R_2$ is 4-(N-phenylamino); Y is 1,6-hexylene; and $n$ is 2.

24. N,N-bis - {3 - [4-(N-phenyl-N-methylamino)-1-piperidyl]propyl}amine according to claim 4 wherein $R_2$ is 4-(N-phenyl-N-methylamino); Y is 1,3-propylene; and $n$ is 2.

25. 3-[4-(N-phenyl-N-ethylamino)-1-piperidyl]-propylamine according to claim 4 wherein $R_2$ is 4-(N-phenyl-N-ethylamino); Y is 1,3-propylene; and $n$ is 1.

26. N,N-bis-{3-[4-(N-phenyl-N-acetylamino) - 1 - piperidyl]propyl}amine according to claim 5 wherein $R_2$ is 4-(N-phenyl-N-acetylamino); Y is 1,3-propylene; and $n$ is 2.

References Cited
UNITED STATES PATENTS

| | | | |
|---|---|---|---|
| 2,813,904 | 11/1957 | Lott et al. | 260—293 |
| 2,928,829 | 3/1960 | Mull | 260—293 |
| 2,945,032 | 7/1960 | Marxer | 260—293 |
| 3,222,370 | 12/1965 | Cavallito et al. | 260—293 |

JOHN D. RANDOLPH, *Primary Examiner.*

A. SPEVACK, *Assistant Examiner.*

UNITED STATES PATENT OFFICE
CERTIFICATE OF CORRECTION

Patent No. 3,381,012                      April 30, 1968

Bernard L. Zenitz et al.

It is hereby certified that error appears in the above numbered patent requiring correction and that the said Letters Patent should read as corrected below.

Column 1, lines 61 to 65, the formula should appear as shown below:

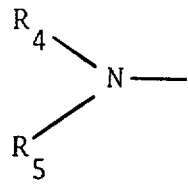

Column 6, line 39, "anti-fugal" should read -- anti-fungal --; line 64, "2.4 g." should read -- 25.4 g. --. Column 9, TABLE 3, third column, line 31 thereof, "benzoly" should read -- benzoyl --; same TABLE 3, third column, line 32 thereof, "4-$C_6H_5$NCONH$_2$" should read -- 4-$C_6H_5\overset{|}{N}CONH_2$ --. Column 13, TABLE 6, in the heading to the right-hand column, cancel "(s.c.)"; same TABLE 6, lines 1, 2, 3, 4, 6, 8, 9 and 11, the right-hand column, after the numbers insert -- (s.c.) --; same TABLE 6, lines 5, 7 and 10, after the numbers insert -- (p.o.) --.

Signed and sealed this 30th day of September 1969.

(SEAL)
Attest:

EDWARD M. FLETCHER, JR.                      WILLIAM E. SCHUYLER, JR
Attesting Officer                              Commissioner of Patents